Figure 3A:
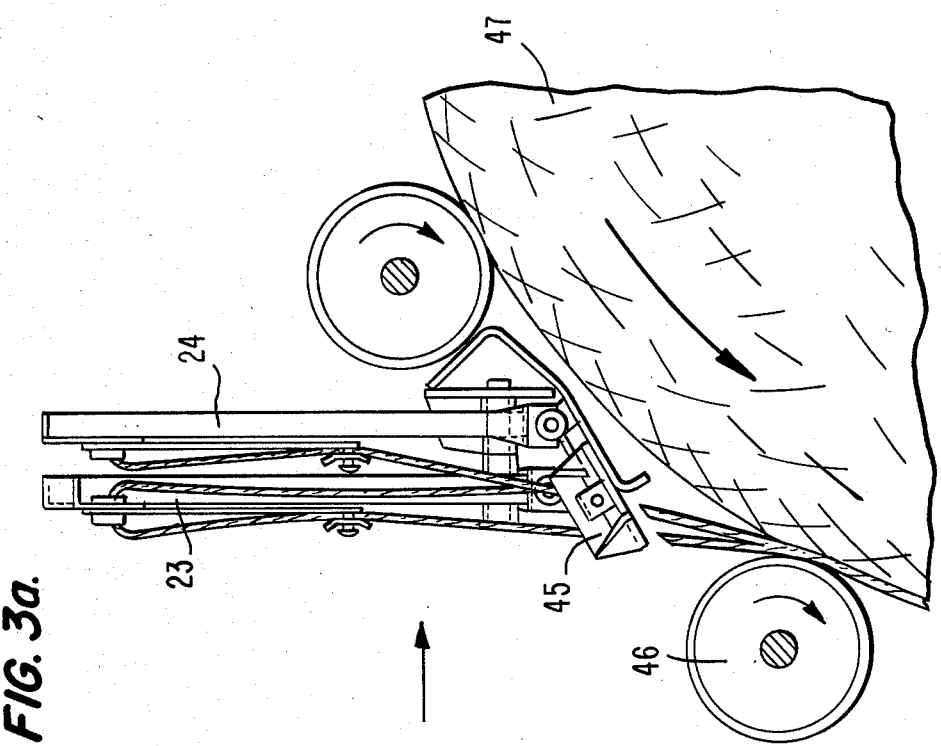

United States Patent [19]

Schaible

[11] Patent Number: 4,557,189
[45] Date of Patent: Dec. 10, 1985

[54] APPARATUS FOR BINDING ROLLED BALES OF AGRICULTURAL HARVESTED CROPS

[75] Inventor: Siegfried Schaible, Singen, Fed. Rep. of Germany

[73] Assignee: Klockner-Humboldt-Deutz AG Zweigniederlassung Fahr, Gottmadingen, Fed. Rep. of Germany

[21] Appl. No.: 616,405

[22] Filed: Jun. 1, 1984

[30] Foreign Application Priority Data

Apr. 13, 1984 [DE] Fed. Rep. of Germany ....... 3414080

[51] Int. Cl.⁴ .......................................... B65B 13/18
[52] U.S. Cl. ........................................ 100/4; 56/343; 100/5; 100/13; 100/88
[58] Field of Search ........................... 100/4, 5, 13, 88; 56/343

[56] References Cited

U.S. PATENT DOCUMENTS

| | | | |
|---|---|---|---|
| 3,064,556 | 11/1962 | Luebben | 100/5 |
| 4,057,954 | 11/1977 | Mast | 100/5 |
| 4,150,614 | 4/1979 | Schwartz | 100/5 |
| 4,167,844 | 9/1979 | Freimuth | 100/5 X |
| 4,248,143 | 2/1981 | Gaeddert | 100/5 |
| 4,253,389 | 3/1981 | Campbell et al. | 100/5 |
| 4,378,732 | 4/1983 | Simmonis | 100/5 |

FOREIGN PATENT DOCUMENTS

3042254  5/1982  Fed. Rep. of Germany .

*Primary Examiner*—Billy J. Wilhite
*Attorney, Agent, or Firm*—Laurence R. Brown

[57] ABSTRACT

The apparatus for binding rolled bales comprises at least one reel of twine, a twine guiding device for guiding the hank of twine along the surface of the bale to be bound and a control device for the twine guiding device, comprising a rope sheave and a set of gears. The twine guiding device comprises two spaced twine guiding arms staggered with respect to one another which may be pivoted in the opposite direction one from the other from an initial position, in which the two arms cross over one another, to a maximum position, in which the two ends of the bale are simultaneously bound, to an end position, which corresponds essentially to the initial position.

15 Claims, 8 Drawing Figures

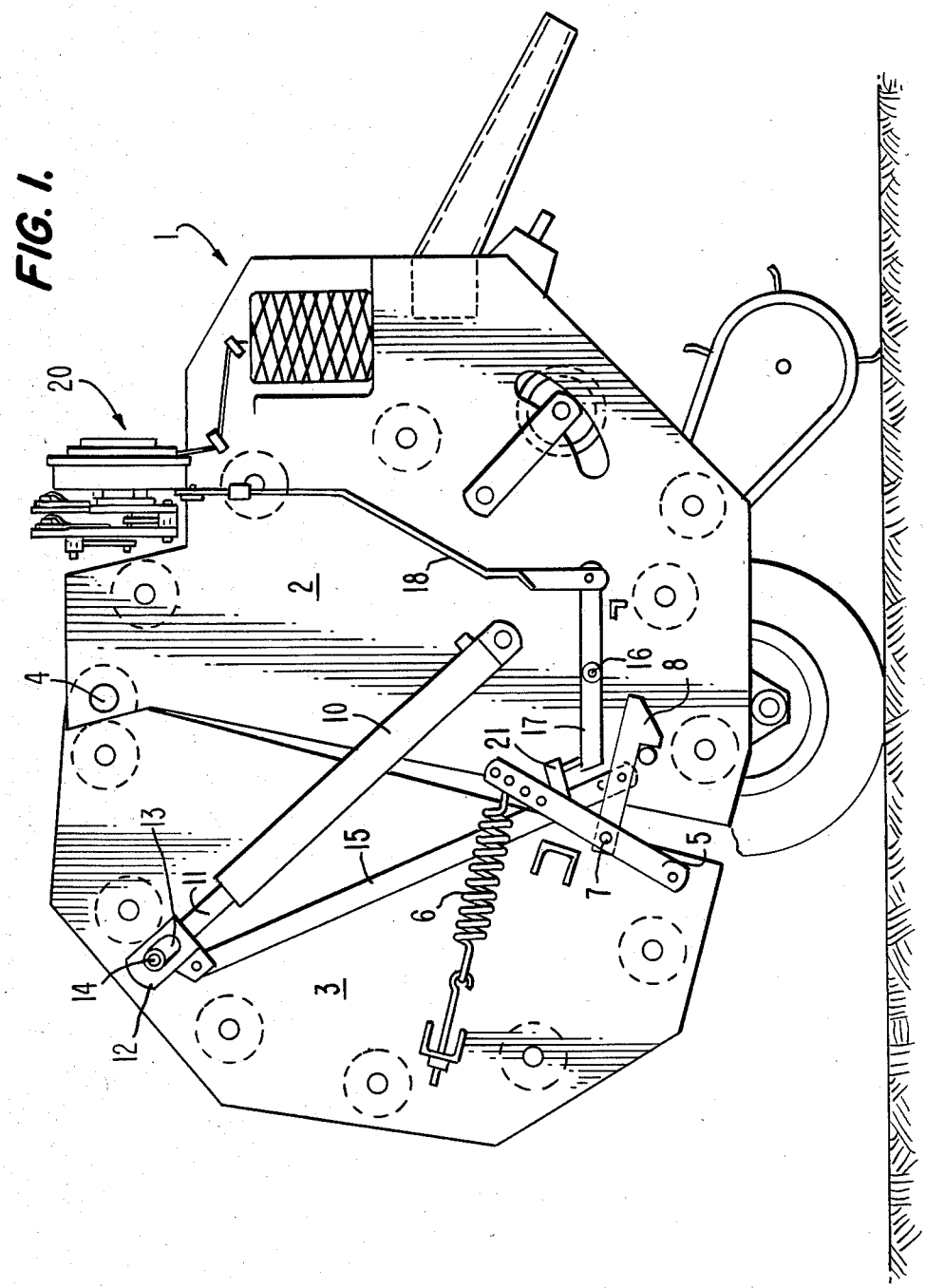

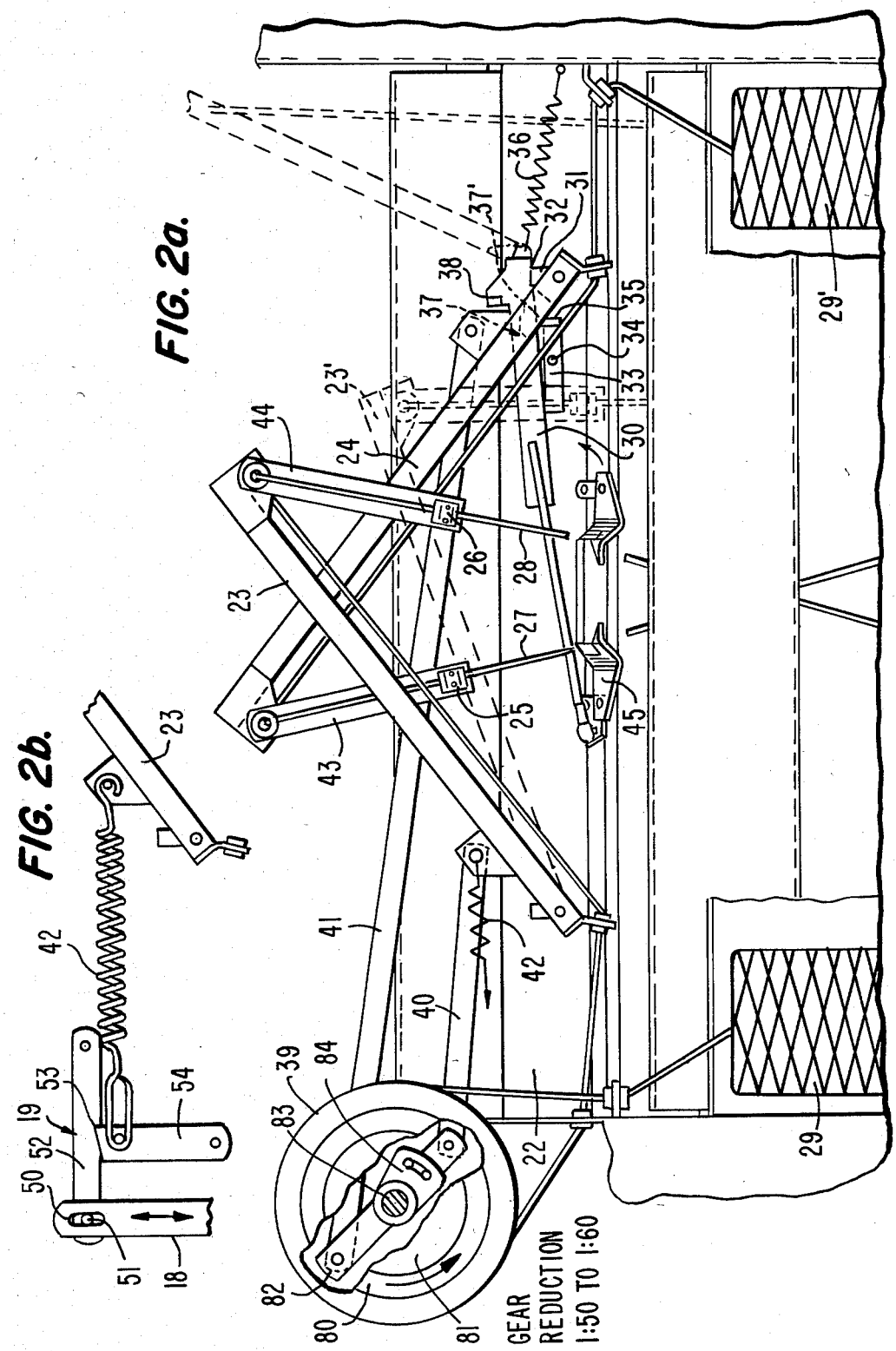

APPARATUS FOR BINDING ROLLED BALES OF AGRICULTURAL HARVESTED CROPS

The present invention relates to an apparatus for binding rolled bales of agricultural harvested crops, comprising at least one reel of twine, a twine guiding device for guiding the hank of twine along the surface of the bale to be bound, and a control device for the twine guiding device, exhibiting a rope sheave and a set of gears.

Large bale presses for binding rolled bales containing up to several cubic meters are becoming more and more widely used in agriculture. Such machines usually have a rolling chamber along the periphery of which there is a plurality of rollers driven in the same direction which form the harvested crops, e.g. hay, straw or corn fodder, into cylindrical bales which, at the end of the rolling process, are bound with a suitable baler twine. They are then ejected through the rear flap opened at the back of the rolled bale press.

In order to bind such rolled bales with twine after they have finished being wound, it is already disclosed in German Pat. No. 30 42 254 to provide a binding device having a guide element for guiding a hank of twine along a draw-in gap extending across the width of a pressing chamber housing, having a spring element which is tensioned by the movement of the guide element from a position of rest into an opposite starting position and which draws the guide element back into its position of rest, a control device controlling the return movement during the binding process. The control device is designed as a ratchet mechanism which holds the guide element in position against the power of the spring element and releases its gradual return movement under the spring power.

In this known apparatus, a twine guiding arm is pivoted on a rocking shaft in the center of a cross piece, the twine guiding arm describing an arc-shaped path and sweeping along the draw-in gap against the power of the tension spring. Shortly before the rolling process is over, the twine guiding arm is swung into a central position and held there temporarily. In this position the free end of the twine is grasped by the rolled bale and carried along with it. A further manual pull on the tripping device causes the twine guiding arm to swing into its starting position corresponding to the end of the rolled bale and be held there temporarily, also by rope tension, so that it can apply parallel initial windings to the front surface of the rolled bale. The number and position of the initial windings must be set manually.

After the tripping rope has been released, the helical binding of the rolled bale begins. The twine guiding arm sweeps over the rolled bale from its starting position at one end of the rolled bale to its initial position at the other end of the rolled bale, binding the latter helically without the twine crossing itself on the surface of the rolled bale.

It has now been observed that the pressure applied by the binding apparatus is not sufficient due to the low friction between the agricultural harvested crops to be bound and the baler twine, so that the bale is not bound tightly enough in the case of such helical binding. Furthermore, it takes a considerable period of time for such a twine guiding arm to sweep over the entire surface of the bale, so that about 50 to 60 seconds go by from the beginning of the binding process until the end of the binding process; this period is already considerably longer than the actual winding process for the rolled bale.

The present invention is based on the problem of providing an apparatus for binding rolled bales of agricultural harvested crops, by which the rolled bales can be bound much more firmly than up to now and which works much faster, thereby considerably shortening the harvesting process as a whole.

Assuming an apparatus of the type stated at the outset, this problem is solved by the following features: the twine guiding device exhibits two spaced, pivotable twine guiding arms arranged on separate planes, the two twine guiding arms are hinged to a cross rib provided parallel to the draw-in gap, each twine guiding arm may be pivoted in the opposite direction to the other by its own connecting rod connected to the set of gears, from an initial position, in which the two twine guiding arms cross over one another and the middle area of the bale is bound, to a maximum position, in which the two ends of the bale are simultaneously bound, to an end position, which corresponds essentially to the initial position, and the two twine guiding arms can be driven via the rope sheave and the set of gears by the twine itself.

The set of gears can comprise either a ratchet gear or a planet gear having a multiplication of about 1:50 to 1:60.

The apparatus is preferably provided with a tripping device connected via a linkage of rods to the rear flap of the rolled bale press and activating the apparatus when the rear flap is opened.

The tripping device advantageously exhibits a rib provided with a recess with which a pawl engages, the pawl being connected via a tension spring to one of the twine guiding arms.

It is particularly favorable for the slide rod which operates the tripping device to be connected with a two-arm lever pivoted on the side of the front part of the pressing chamber and operated by the rear pivotable part of the pressing chamber.

Preferably, extensions are pivoted to the outer free ends of the twine guiding arms, having at their lower ends twine brakes for guiding the freely hanging ends of twine into the vicinity of the draw-in gap.

The apparatus further comprises a cutting device which can be displaced by one of the twine guiding arms from a position of rest into a working position and vice versa.

In a particularly advantageous embodiment, the cutting device is connected via a trip link to the twine guiding arm, a cam being provided on the twine guiding arm which engages with a recess in the trip link, while a two-arm lever is pivoted to a bolt and has a projection on which the twine guiding arm is supported during its movement.

The trip link can be connected with a spring in such a way that the recess lies against the cam while the twine guiding arm may be provided on the back with a cam which cooperates with a projection on the trip link.

The cutting device itself is advantageously equipped with two blades so that the two pieces of twine can be cut off simultaneously after the binding process is over.

Preferably, the rope sheave is connected via an eccentric and via a rocker to the set of gears, the set of gears being connected to a roller which operates a crank gear for the twine guiding arms, the two connecting rods being staggered from one another at 180° on this crank gear.

The inventive apparatus provides several advantages. Since the beginning and the end of the binding process take place in the middle of the bale, the two hanks of twine cross over one another at the very start and before the end of the binding process, so that the hanks of twine can be wound around the bale tightly with increased pressure. If there is no such crossing over, as is often the case in the binding systems known up to now, the bales bound in such a manner tend to be conical since the binding can only be tight when the first crossing over has taken place.

Due to the immediate crossing over at the very beginning of the binding process according to the invention, tight initial winding can immediately be applied to the bale, which is then held together better.

The two twine guiding arms, each of which binds only slightly more than half of the bale, allow for a considerable reduction of the binding time required. A large bale can be completely bound in 8 to 10 seconds.

Due to the triggering of the binding apparatus by the rear flap as it opens, i.e. after the wound bale has been completed, the operator no longer needs to intervene manually. The bale is wound, bound and ejected, since the two hanks of twine are automatically severed when the binding is over and the binding apparatus automatically comes to a halt.

Conical formation of the bale is avoided by placing several criss-crossing windings in the middle of the bale, and also several closely adjacent windings at the ends of the bale, while the areas in between are covered more quickly due to the design of the drive kinematics for the two twine guiding arms.

In the following, the invention shall be described in more detail with reference to the drawings, which show an advantageous embodiment.

These show in:

FIG. 1 a side view of an inventive round bale press

FIG. 2a an enlarged view of the inventive apparatus

FIG. 2b an enlarged view of the tripping device

Figure 3B:
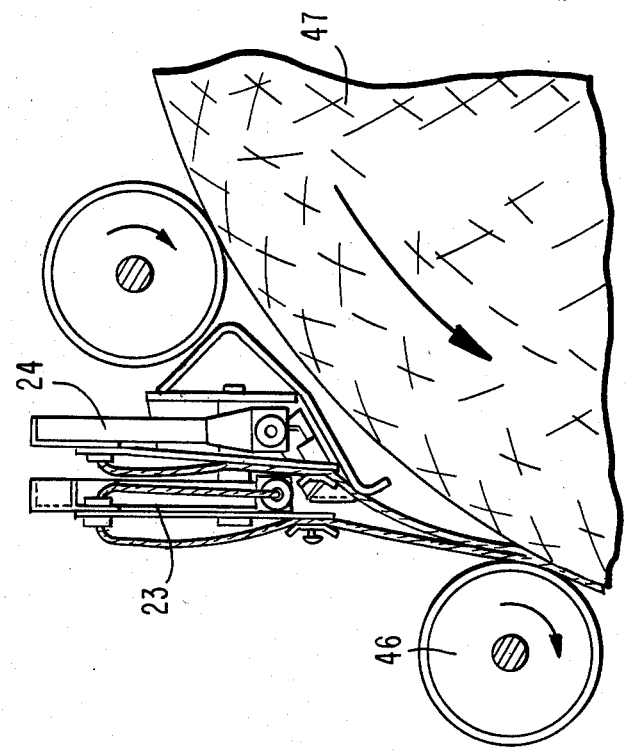
Figure 4A:
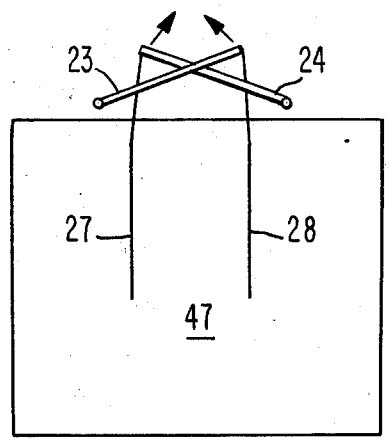
Figure 4B:
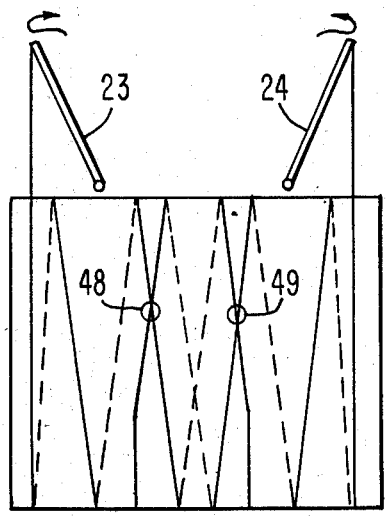
Figure 4C:
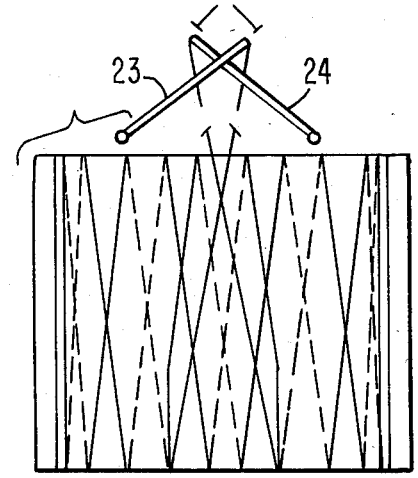

FIGS. 3a and 3b two side views of the inventive apparatus in different positions FIGS. 4a to 4c the binding pattern for a rolled bale The rolled bale press shown in FIG. 1 is provided with a pick-up device for picking up the harvested crop and introducing it into the pressing chamber to be formed into cylindrical bales, this pick-up device being arranged between a front stationary part 2 and a rear part 3 which may be upwardly pivoted in the clockwise direction around a horizontal axle 4.

During normal operation parts 2 and 3 are locked together. The lock is provided for by a pivoted lever 5, the free end of which is acted upon by a tension spring 6. Both lever 5 and tension spring 6 are hinged to the rear part 3 of the pressing chamber.

In approximately the middle of lever 5 there is a locking hook 8 pivoted around a horizontal axle 7 and engaging over a stationary bolt 9 in front part 2 of the pressing chamber. By aid of lever 5, tension spring 6, locking hook 8 and bolt 9, rear part 3 and front stationary part 2 of the pressing chamber are held against one another as long as there are no forces acting upon the rear part of the pressing chamber to deflect it. Further, a plurality of pressing rollers are arranged along the periphery of the pressing chamber, one of which is designated as 46 in FIG. 3b.

So that rear part 3 of the pressing chamber can be swung out upwardly, a hydraulic cylinder 10 of simple action is provided. The free end of piston rod 11 of hydraulic cylinder 10 is provided with a fork head 12. Worked into the interior of this fork head 12 there is an oblong hole 13 which encloses a stationary bolt 14. Further, fork head 12 is connected with locking hook 8 via a rib 15. When piston rod 11 of hydraulic cylinder 10 is moved out, locking hook 8 is first drawn upwardly via rib 15 so that now, since the lock has been released, rear part 3 of the pressing chamber can be swung upwardly in order to unload a finished rolled bale. Conversely, parts 2 and 3 are automatically locked together when piston rod 11 is moved in.

On the side of front part 2 of the pressing chamber, a two-arm lever 17 is pivoted around a bolt 16. The end of two-arm lever 17 shown on the right in the drawing is connected via a slide rod 18 with a tripping device 19 (FIG. 2b) of binding device 20.

As soon as rear part 3 of the pressing chamber has been deflected against the power of the tension spring when a round bale has almost reached its final size, lever 5 is swivelled in a clockwise direction around axle 7. A stop boss 21 located on lever 5 then presses on the end of lever 17 located on the left, thereby pushing the slide rod upward. Binding device 20 is then unlocked and is ready for operation.

Tripping device 19 (FIG. 2b) is unlocked by slide rod 18 raising a rib 52 at one end of which it is hinged via a bolt 51 penetrating through an oblong hole 50 in slide rod 18. The raising of rib 52, which is provided with a recess 53, causes safety bolt 54, which engages with this recess, to be released, this safety bolt being hinged at its lower end to the housing. Safety bolt 54 is connected via a tension spring 42 of sufficient length and strength with one of twine guiding arms 23, which, after tripping device 19 has been unlocked, falls downward somewhat due to gravity, as indicated in FIG. 2a by the dotted position 23'. Due to the connection between the two twine guiding arms, the second twine guiding arm, which crosses over the first twine guiding arm in its initial position, also moves the same distance downward, whereby the ends of twine hanging down freely come into the draw-in gap between the rolled bale and the pressing roller and are taken along.

FIG. 2a shows the twine guiding arms and their drive mechanismus, as well as the cutting device. Twine guiding arms 23, 24 are hinged at their lower ends to cross strut 22 which extends parallel to the pressing rollers and is firmly connected to the housing of the round bale press. Each twine guiding arm 23, 24 is connected by its own connecting rod 40,41 to a set of gears 80,81 which may comprise a planet gear or a ratchet gear, for example. The set of gears, which has a reduction of 1:50 to 1:60, is connected with a rope sheave 39 having several grooves along its outer circumference. The connecting rods may be hinged to a crank mechanism 82 connected with a roller 83 which in turn is connected via a rocker and an eccentric 84 to the rope sheave which is driven by the twine 28 as it is spooled off. Twine 28 is dispensed by a twine supply reel 29, winds around rope sheave 39 at least once and runs along twine guiding arm 23 to its upper free end at which there is a pivoted extension piece 44 having a twine brake 26 arranged at its lower end. Analogously, a second piece of twine 27 runs from a twine supply reel 29' along second twine guiding arm 24 and its pivoted extension 43, which is also provided with a twine brake 25.

Twine guiding arms 23, 24 can be swivelled in the opposite direction to one another, the fulcrums being staggered on cross rib 21 relative to the longitudinal axis of this cross rib in such a way that twine guiding arms 23, 24 do not touch one another when being swivelled in the opposite direction to one another.

When a rolled bale has been completed in the pressing chamber of the round bale press, the tripping device 5 as in FIG. 2b, which is connected with the rear pivoted part 3 of the pressing chamber, activates the inventive apparatus. Twine guiding arm 23 unlocked in this manner moves slightly downward under the effect of gravity, as indicated in FIG. 2a by 23'. Due to twine guiding arm 23 being connected via its connecting rod 40 with the set of gears and rope sheave 39, second twine guiding arm 24, which in its initial position crosses twine guiding arm 23, is also moved slightly downward, so that the ends of hanks of twine 27, 28 hanging down freely from extension pieces 43, 44 enter the draw-in gap (FIG. 3a) and are taken along by rotating pressing roller 46 and rotating rolled bale 47. Rope sheave 39 now begins to rotate at the corresponding speed, operating the set of gears. Due to the reduction by the set of gears, the two twine guiding arms 23, 24 are pivoted much more slowly than corresponds to the unreeling of the two pieces of baler twine 27, 28, the arms being pivoted in the opposite direction to one another from the original crossing initial position to a maximum position corresponding to the binding of the outer ends of rolled bale 47, and then to an end position corresponding approximately to the initial position during binding.

The corresponding binding pattern is shown in FIGS. 4a to 4c. FIG. 4a shows the initial position, in which the two twine guiding arms 23, 24 are crossed, and FIG. 4b the maximum position, in which the two twine guiding arms bind the ends of rolled bale 47. FIG. 4c shows the end position, in which twine guiding arms 23, 24 are approximately back in their initial positions. It can be clearly seen in these figures that two intersections 48, 49 of the two pieces of baler twine 27, 28 come about immediately after the binding process has begun, thus allowing for much better pressure to be exerted on the bale which can thus be bound more tightly than was previously possible. FIG. 4c also shows that several windings lie directly beside each other in the vicinity of the ends of rolled bale 47, since twine guiding arms 23, 24 move more slowly at these points than in the area between their maximum position and their end position.

The binding of the rolled bale thus begins in its middle and, since each twine guiding arm 23, 24 describes approximately a quarter circle, that is, in both directions, the binding process is finished much more quickly, achieving an even and firm binding of bale 47. Shortly before the end of the binding process, there is a further crossing of the hanks of twine in the middle. An important advantage is therefore that the baler twine is crossed both at the beginning of the binding process and before it ends, allowing for very tight binding while maintaining, at the same time, the cylindrical shape.

In order to achieve a completely automatic functioning of the inventive apparatus, pieces of baler twine 27, 28 must be severed after the binding process is over. For this purpose a cutting device 45 is provided which is arranged so as to be movable on cross rib 22 and can be displaced by one of the twine guiding arms from its position of rest into a cutting position, in which the two pieces of twine are severed.

FIGS. 2a and 3a show cutting device 45 in its cutting position. Left-hand twine guiding arm 23, which is pivoted in a clockwise direction, and right-hand twine guiding arm 24, which is pivoted in a counter-clockwise direction, guide the two hanks of twine 27, 28 into a recess in cutting device 45 in which two blades (not shown) are provided opposite one another. Hank of twine 28 of left-hand twine guiding arm 23 runs against a blade located on the right, and hank of twine 27 of right-hand twine guiding arm 24 moves analogously onto a blade located on the left, so that both hanks of twine are severed.

Cutting device 45 is connected via a connecting linkage of rods and a trip link 30 to twine guiding arm 24 located on the right. For this purpose a cam 31 is provided on twine guiding arm 24, this cam 31 engaging with a recess 32 in trip link 30. Below the trip link there is a two-arm lever 33 pivoted on a bolt 34. The end of lever 33 located on the right exhibits a projecting boss 35 located in the path of movement of right-hand twine guiding arm 24 being pivoted in a counterclockwise direction. Additionally, the power of a spring 36 acts on trip link 30 in such a way that recess 32 always lies against cam 31.

At the end of the pivoting movement of right-hand twine guiding arm 24, the latter comes to lie against boss 35. Lever 33 is pivoted in a clockwise direction and, with its left-hand end, presses trip link 30 upwardly. This disengages cam 31 and recess 32, and tension spring 36 pulls cutting device 45 via the connecting linkage of rods towards the right out of its cutting position. Trip link 30 slides with its lower edge onto cam 31.

The round bale press is now ready to form a new rolled bale. When it has been completed and bound, cutting device 45 is again moved from its position of rest into its cutting position. For this purpose, right-hand twine guiding arm 24 is provided on the back with a further cam 37 (indicated by the dotted lines). This cam 37 cooperates with a projecting boss 38 on the trip link. Cutting device 45, the connecting linkage of rods and trip link 30 must be returned from their right-hand end positions (not shown), into which they were moved by tension spring 36, into the shown cutting position after a binding process.

As soon as the right-hand twine guiding arm 24 has been moved into its extreme end position (indicated by dotted lines), trip cam 37 has run over stop boss 38 and engages behind boss 38 with its edge 37'. During the swivelling movement of right-hand twine guiding arm 24 which now follows in a counter-clockwise direction, cam 37 displaces, since it lies against boss 38, the trip link with the cutting device toward the left until cam 31 again locks with recess 32 of trip link 30. The cutting device can then be conveyed into its definitive cutting position.

FIGS. 3a and 3b show the twine guide arms schematically from the side. FIG. 3a shows the position in which cutting device 45 takes effect, while FIG. 3b shows the twine guiding arms in their lowest position, i.e. when the relatively short hanging ends of hanks of twine 27, 28 are grasped and drawn in by rotating pressing roller 46 and rolled bale 47.

Due to the short period required for binding the rolled bale, in the range of 8 to 10 seconds, a much larger surface performance is achieved than with the binding arrangements known up to now. Due to the completely automatic operation of the binding process and the completely automatic switching off when the rolled bale is completed, the machine operator is relieved in his work.

A further advantage must be seen in the fact that, due to the inventive design of the control of the twine guiding arms, the middle area of the rolled bale to be bound is run over relatively quickly while the edges of the rolled bale are run over slowly, so that several windings are placed next to each other at the two ends of the cylindrical rolled bale.

I claim:

1. An apparatus for binding rolled bales of agricultural harvested crops, comprising at least one reel for holding twine, a twine guiding device for guiding a hank of twine along a surface of the bale to be bound and a control device for the twine guiding device, comprising a rope sheave and a set of gears, wherein the twine guiding device exhibits two spaced, pivotable twine guiding arms staggered with respect to one another and hinged to a cross rib frame member, each twine guiding arm having means for pivoting the respective arms in opposite directions by a connecting rod connected to said set of gears for moving the guiding arms from an initial position, in which the two twine guiding arms cross over one another and a middle area of the bale is bound, to an end position, in which the two ends of the bale are simultaneously bound, means for feeding twine from the reel and through the guiding device to a mechanism for wrapping the twine about the rolled bales, and driving means for moving the two twine guiding arms via said rope sheave and the set of gears by means of feeding of the twine.

2. An apparatus as in claim 1, wherein the set of gears comprise a ratchet gear with a reduction of 1:50 to 1:60.

3. An apparatus as in claim 1, wherein the set of gears comprise a planet gear which is arranged in the rope sheave, with a reduction of 1:50 to 1:60.

4. An apparatus as in claim 1, wherein a pick-up device for picking up a harvested crop includes said apparatus and a pressing chamber with a front stationary part and a rear flap which opens when a bale is formed, including a tripping device which is connected via a linkage of rods with the rear flap of the rolled bale press to actuate the apparatus when the rear flap is opened.

5. An apparatus as in claim 4, wherein the tripping device includes a rib lever arm provided with a recess with which a locking pawl engages, and means coupling the locking pawl via a tension spring with one of the twine guiding arms.

6. An appartus as in claim 5, wherein means including a slide rod for activating the tripping device is connected with a two-arm pivotable lever which is hinged at the side of the front part of the pressing chamber and which is operated by rising the rear pivotable part of the pressing chamber.

7. An apparatus as in claim 4, wherein the linkage of rods includes a stop boss which is attached to a lever pivoted to the rear part of the pressing chamber acted upon by a tension spring, and a locking hook arranged on the lever detachably embracing a latch member on the front stationary part of the pressing chamber.

8. A apparatus as in claim 7, wherein a hydraulic cylinder is provided on the stationary part of the pressing chamber, a rib being hinged on one end of the piston rod being connected with the locking hook.

9. An apparatus as in claim 1, wherein pivoted extensions are provided at outer free ends of the twine guiding arms and carry twine brakes.

10. An apparatus as in claim 1, including a cutting device displaceable by one of the twine guiding arms from a position of rest into a twine cutting position and vice versa.

11. An apparatus as in claim 10, wherein the cutting device is connected via a trip link having a recess with the twine guiding arm, a cam is provided on the twine guiding arm for engaging with the recess in the trip link, and a two-arm lever is provided pivoted on the frame member, having a projection on which the twine guiding arm is supported during its movement.

12. An apparatus as in claim 11, wherein the trip link is connected with a spring in such a way that the recess lies against the cam.

13. An apparatus as in claim 12, wherein the trip link has a projection and the twine guiding arm is provided with a cam which cooperates with the projection on the trip link.

14. An apparatus as in claim 13, wherein the cutting device is equipped with two blades for respectively cutting twine guided by the two arms.

15. An apparatus as in claim 1, wherein the rope sheave is connected with the set of gears via an eccentric and via a rocker, and the set of gears is connected with a roller which activates a crank mechanism for the twine guiding arms, the two connecting rods being staggered from one another at 180° on this crank mechanism.

* * * * *